United States Patent
Fischer et al.

(10) Patent No.: US 6,815,489 B1
(45) Date of Patent: Nov. 9, 2004

(54) NANOCOMPOSITE COATINGS

(75) Inventors: Hartmut Rudolf Fischer, Mierlo (NL); Lawrence Fabian Batenburg, Eindhoven (NL); Harmen Anne Meinema, Leusden (NL); Marinus Pieter Hogerheide, Breda (NL); Cornelis Hermanus Arnoldus Rentrop, Tilburg (NL)

(73) Assignee: Nederlandse Organisatie voor toegepast-natuurwetenschappelijk Onderzoek TNO (NL)

( * ) Notice: Subject to any disclaimer, the term of this patent is extended or adjusted under 35 U.S.C. 154(b) by 116 days.

(21) Appl. No.: 10/030,285

(22) PCT Filed: Jul. 7, 2000

(86) PCT No.: PCT/NL00/00479
§ 371 (c)(1),
(2), (4) Date: May 13, 2002

(87) PCT Pub. No.: WO01/04050
PCT Pub. Date: Jan. 18, 2001

(30) Foreign Application Priority Data

| Jul. 13, 1999 | (NL) | 1012587 |
| Oct. 22, 1999 | (NL) | 1013373 |

(51) Int. Cl.$^7$ ................................................ C08K 3/34
(52) U.S. Cl. ...................... 524/447; 524/450; 524/448; 524/155; 524/127
(58) Field of Search ................................ 524/186, 445, 524/447, 446; 523/200, 210; 501/145, 147, 148

(56) References Cited

U.S. PATENT DOCUMENTS

| 4,136,103 A | * | 1/1979 | Oswald ........................... 556/9 |
| 6,262,162 B1 | * | 7/2001 | Lan et al. ...................... 524/445 |
| 6,486,254 B1 | * | 11/2002 | Barbee et al. ................. 524/445 |
| 6,610,772 B1 | * | 8/2003 | Clauberg et al. ............. 524/445 |

FOREIGN PATENT DOCUMENTS

| EP | 0 681 990 A1 | 11/1995 |
| EP | 0 791 556 A1 | 8/1997 |
| EP | 0 952 187 A1 | 10/1999 |
| WO | WO 00 09599 A | 2/2000 |

OTHER PUBLICATIONS

Database WPI, Section Ch, Week 199538, Derwent Publications Ltd., London, GB; Class A25, AN 1995–290037 XP002141992 & JP 07 187657 A (Agency of Ind Sci & Technology), Jul. 25, 1995 abstract.

* cited by examiner

*Primary Examiner*—Katarzyna Wyrozebski
(74) *Attorney, Agent, or Firm*—Muserlian, Lucas and Mercanti

(57) ABSTRACT

The invention relates to a method for preparing a composition for coating, wherein a layered, inorganic filler is subjected to an ion exchange with a modifier, which modifier comprises at least two ionic groups, which groups are separated from each other by at least four atoms, and wherein the modified filer, together with a polymer, is dispersed in a diluent.

16 Claims, No Drawings

NANOCOMPOSITE COATINGS

This invention relates to a composition for forming a coating, and to a coating formed from such composition.

In the literature, it has already been proposed several times to incorporate a layered inorganic filler, such as a clay, into a coating. A difficulty here, however, is that compositions for coatings are normally based on polymeric systems in a diluent. These polymeric systems often have a hydrophobic character, whereas the filler has a more hydrophilic character. This makes the two components intrinsically immiscible.

There are different, more and less successful procedures known for alleviating the problem of the intrinsic immiscibility of the two materials. In most cases, to that end, an ion exchange is carried out, whereby ions between the sheets of the layered filler are exchanged for ions which have an organic character, which makes them compatible with the polymeric matrix.

Although in publications on this subject it is mentioned in most cases that the above-described method for uniting the layered filler and a polymeric matrix relates to both polymeric bulk materials and coatings, in practice only the issues involved in bulk materials are addressed.

In the case of coatings, there is, in addition to the above-outlined problem of the intrinsic immiscibility, another problem. After application, a composition for a coating should cure into a solid coating. This not only requires that the diluent evaporates, but also that a curing reaction occurs. This reaction is mostly initiated and/or catalyzed by heat, oxygen, addition of an extra reactant (crosslinking agent) or light (UV radiation). Of course, the presence of the layered filler should not disturb the curing process. It has been found that this problem has not been adequately resolved yet in the prior art.

In European patent application 0 791 556 a water-dispersible organic clay complex is described, in which a quaternary ammonium ion is present in the interlamellar space of an expansible phyllosilicate. The ammonium ion comprises an oxypropylene unit and an oxyethylene unit. The complex is used for controlling the rheology of a water-based coating agent.

The international patent application 98156598 relates to a barrier coating consisting of an elastomer and a dispersed, layered filler in a liquid carrier. The coating is used in particular in (car) tires. In order to enable proper dispersion of the filler, which is preferably vermiculite, and the elastomer, in the liquid carrier, use is made of a surfactant. Examples of suitable surfactants that are mentioned are known wetting agents, antifoam agents, emulsifiers, dispersing agents and the like. Preferably, nonionic surfactants are used.

The object of the present invention is to provide a coating composition comprising a layered, functional inorganic filler, a polymeric matrix and a diluent, which does not have the disadvantages of the known compositions. What is contemplated in particular is that the composition, after being applied, cures to form a coating having very good properties, in particular barrier properties. It is then desirable that the filler has no or hardly any adverse effect on the curing reaction of the composition. What is further contemplated is for the filler to be homogeneously dispersed through the composition.

Surprisingly, it has presently been found that these objects can be achieved by subjecting the layered, inorganic filler to an ion exchange with a modifier before incorporating the filler in a composition for a coating, which modifier comprises at least two ionic groups, which groups are separated from each other by at least four atoms. Thus, the invention relates to a method for preparing a composition for a coating, wherein a layered, inorganic filler is subjected to an ion exchange with a modifier, which modifier comprises at least two ionic groups, which groups are separated from each other by at least four atoms, and wherein the modified filler, together with a polymer, is dispersed in a diluent.

What is achieved according to the invention by the use of the specific modifier is that the layered inorganic filler together with the polymer is homogeneously dispersed in the diluent. Further, it has been found that the modified filler substantially does not have any adverse effect on the curing of the composition when it has been applied for forming a coating. The cured layer has particularly favorable properties, such as a reduced permeability to gases and liquids, and an improved heat resistance. Further, the coating has been found to possess improved surface properties (resistance to scratches and the like), without this affecting the bonding of the layer to a substrate or the flexibility of the layer.

The layered inorganic filler which is used according to the invention can be both cationic and anionic in nature. In principle, any anionic or cationic filler obtained synthetically or from a natural source can be used. Suitable examples can be selected from the classes of clays and layered double hydroxides.

Eminently suitable are clay types based on layered silicates, such as layered phyllosilicate which is made up of magnesium and/or aluminum silicate layers each about 7–12 Å thick. Particularly preferred are smectite-type clay minerals such as montmorillonite, saponite, hectorite, fluorohectorite, beidellite, nontronite, vermiculite, halloysite and stephanite. These materials impart very favorable mechanical properties and an increased thermal stability to a coating.

A suitable clay type preferably has a cation exchange capacity of 30 to 250 milliequivalents per 100 grams. When that capacity is higher than the upper limit mentioned, it proves to be difficult to finely disperse the clay at a molecular level because of the strong mutual interaction of the layers of clay. When the cation exchange capacity is lower than the lower limit mentioned, the clay proves to be difficult to modify in that the interaction with the modifier is small. Preferably, a clay is used having a cation exchange capacity of from 50 to 200 milliequivalents per 100 grams.

Another layered, inorganic filler that can be used according to the invention is a layered double hydroxide (LDH). This material is a so-called anionic clay, consisting of small crystalline sheets of dimensions of a few nanometers, between which anions are located. By these anions are meant anions other than hydroxyl groups. A layered double hydroxide can be both natural and synthetic in nature. For a description of possible methods of preparation for a synthetic layered double hydroxide, reference is made to U.S. Pat. Nos. 3,539,306 and 3,650,704.

Preferably, the layered double hydroxide has a large contact surface and an ion exchange capacity of 0.5 to 6 milliequivalents per gram. An LDH preferably used is a hydrotalcite or a hydrotalcite-like material, because these materials can be easily prepared synthetically, while the desired properties can be eminently controlled.

Found to be uncommonly suitable are hydrotalcites that satisfy the formula (I):

$$[M_{1-x}^{2+}M_x^{3+}(OH)_2][A_{x/y}^{y-}\cdot n\, H_2O] \qquad (I),$$

wherein $M^{2+}$ is a bivalent cation, $M^{3+}$ is a trivalent cation, x is a number between 0.15 and 0.5, y is 1 or 2, n is a number from 1 to 10, and A is an anion selected from the group consisting of Cl—, Br—, $NO_3$—, $SO_4^{2-}$— and $CO_3^{2-}$—. The bivalent cation is preferably selected from the group of bivalent magnesium, zinc, nickel, iron, copper, cobalt, calcium and manganese ions and combinations of these bivalent cations. Most preferably, the bivalent cation is a magnesium, zinc or calcium ion or a combination thereof. The trivalent cation is preferably selected from the group of trivalent aluminum, chromium, iron, cobalt and manganese ions and combinations of these trivalent cations. Most preferably, the trivalent cation is an aluminum, chromium or iron ion or a combination thereof It is preferred that the filler, when it is being processed according to the invention, contains substantially no agglomerates of sheets which form the layered structure of the filler. Under normal circumstances the sheets form agglomerates, whereby they stack onto each other. According to the invention, it is preferred to substantially break these agglomerates, so that discrete sheets with a relative distance between the sheets of at least 50 Å, preferably at least 75 Å, and still more preferably at least 100 Å are formed. This distance can be suitably determined using x-ray diffraction techniques.

An example of a suitable procedure for breaking the agglomerates, i.e., for deagglomeration, is a method whereby the filler is dispersed in, preferably, water that is substantially free of ions. This water preferably has a temperature of 20–60° C. Preferably, the amount of filler is not more than 10% by weight, based on the dispersion, so that the viscosity remains low. This has a positive effect on the processability of the dispersion. Thereafter, the filler is allowed to swell for a period between half an hour and a few hours. Other methods of breaking the agglomerates in the filler are known to those skilled in the art.

According to the invention, the filler is subjected to an ion exchange with the modifier.

An important part of the invention is formed by the specific choice of the modifier. This is a compound which comprises at least two ionic groups, with at least four, preferably at least seven, atoms located between the two ionic groups. It has been found that a particularly homogeneous distribution of the modified filler in the composition is obtained when the modifier comprises an aromatic group, such as an optionally substituted benzene or naphthalene group. This advantage is noticeable especially when the aromatic group is located between the at least two ionic groups.

The nature of the ionic groups will depend on the kind of filler that has been selected. When the filler is a cationic clay, at least one ionic group will be cationic. Good results have been achieved with ammonium, sulfonium and phosphonium groups. When the filler is a layered double hydroxide, at least one ionic group will be an anionic group. Examples of suitable anionic groups are carboxylate, sulfonate and phosphonate groups.

In a preferred embodiment, the modifier is a dye. In that way, the modifier can be utilized to give a coating a particular desired color. Suitable are cationic and anionic dyes and dyes which can be brought into cationic or anionic form by protonating or deprotonating. These are, for instance, dyes with $N^+$, $P^+$, $S^+$ functionalities and/or derivatives thereof. Additionally preferred are dyes with anionic functionalities such as $RCO_2^-$, $RP(O)O_2^{2-}$ and $RSO_3^-$, wherein R is defined as an alkyl, aryl or alkylaryl group. Also preferred are dyes where the charge is divided over different functional groups. Examples of suitable dyes are mentioned inter alia in Ullmanns Encyklopädie der technischen Chemie, band 11, Verlag Chemie, Weinheim, 1976 under "Farbstoffen".

The ion exchange can take place by adding a solution of the modifier to a dispersion of the filler in warm water, preferably the dispersion described above. The modifier is preferably dissolved in water in a concentration of between 1% and 50%. The amount of modifier that is used in the ion exchange is selected depending on the ion exchange capacity (CEC) of the filler and molar mass and number of reactive and/or ionic groups of the modifier. The pH of the modifier solution is preferably between 2 and 10, depending on the selected filler and the modifier, and can be adjusted with suitable buffers. The amount of modifier used is preferably 50 to 150% of the ion exchange capacity of the filler (clay).

After the ion exchange, the modified filler is preferably washed a few times with water and filtrated. If desired, the material can be dried, for instance in an oven or by spray-drying or freeze-drying, whereafter it can be ground to form a powder to improve processability. The material thus obtained can be formulated in a conventional manner in a composition for a coating.

To that end, in a random order, the modified filler and the polymer are dispersed in a suitable diluent. It has been found that especially compositions based on polar diluents such as water, alcohols (ethanol), ethers, esters, ketones (acetone) and combinations thereof, benefit from the invention.

The polymer is mixed with the diluent and the modified filler, whereafter the whole composition is homogeneously mixed by means of known dispersion techniques, such as mechanical stirring, ultrasound vibration, dispersing, etc. Depending on the nature of the curing reaction, initiator, additives and pigments can be added to the composition. The initiator content is normally about 0.01 to 10% by weight with respect to polymerizable units, preferably between 0.1 and 1% of the polymerizable units. The additive content can range between 0 and 15% by weight of the whole composition, preferably between 0 and 3%. The pigment content can range between 0 and 50% by weight, being preferably between 0 and 25%. It is also possible to prepare a coating formulation completely, whereafter the modified filler is added. A homogeneous mixture is obtained according to techniques known to those skilled in the art, such as ultrasonically vibrating the whole for, for instance, 30 minutes.

The polymer that is included in the composition can be any polymer that is conventional in compositions for coatings.

The following polymers can be used in the present composition: polyurethanes; polyacrylates; polymethacrylates; polyesters; polyethers; polyolefins; polystyrene; polyvinyl chloride; alkyds; nitrocellulose; epoxides; phenol resins; amino resins; silicones; polysiloxanes, and organic-inorganic hybrid materials; and combinations thereof. The following polymers are preferred: polyurethanes; polyacrylates; polysiloxanes; polyesters; polyethers and organic-inorganic hybrid materials. Organic-inorganic hybrid materials are understood to be materials which are built up from a combination of polymeric organic and inorganic/ceramic components which are mutually chemically bonded on a molecular level, which may further contain inorganic nanoparticles dispersed therein.

The composition can be used for applying coatings in a conventional manner. Suitable application procedures are, for instance, pouring, misting, brush application and the like. After application, the diluent evaporates (drying) and a curing takes place. The present composition is suitable for applying coatings to substrates of all kinds. Examples of materials on which the substrate may be based comprise wood, metal, plastic, glass, textile and the like.

The invention will presently be further elucidated in and by the following examples.

EXAMPLE 1

20 Grams of an EXM 757 clay were dispersed in an excess of water and subjected to a reaction with 6.1 grams of methylene blue (95 meq methylene blue, based on 100 grams of solid clay, which is 100% of the exchange capacity of the clay). After stirring for 30 minutes at 60° C., the solid clay, modified with methylene blue, was filtrated, and purified until there were no traces of chlorine ions present anymore. The material obtained was subsequently freeze-dried.

The thus modified clay was used in a water-carried polyurethane/polycarbonate diol composition (NeoRez R986, commercially available from Zeneca Resins B.V., solids content 35%). To that end, 1.02 grams of the modified clay were mixed with the composition, so that a product was obtained which contained 2.5% by weight of clay, based on the total amount of solid material. The mixture was stirred until no solid particles were visible anymore.

Of the composition that was thus obtained, coatings of a thickness of 90 μm were applied to substrates of steel, glass and aluminum. In addition, such a coating of the water-carried polyurethane/polycarbonate diol composition without modified clay was applied. Of all the coatings, no differences worth mentioning in pencil hardness (ASTM D3363-92A), bend test flexibility (ASTM D 522-93A) and cross-hatch adhesion (ASTM D 3359-95) could be demonstrated. The clay-containing layers proved to be 42% less permeable to moisture (ASTM E96).

EXAMPLE 2

20 Grams of an EXM 757 clay were dispersed in an excess of water and subjected to a reaction with 5.1 grams of methylene red (95 meq methylene red, based on 100 grams of solid clay, which is 100% of the exchange capacity of the clay). After stirring for 30 minutes at 60° C., the solid clay, modified with methylene red, was filtrated, and purified until there were no traces of chlorine ions present anymore. The material obtained was subsequently freeze-dried.

The thus modified clay was used in a water-carried acryl/styrene composition (Neocryl XK-62, commercially available from Zeneca Resins B.V., solids content 42%). To that end, 0.67 grams of the modified clay were mixed with the composition, so that a product was obtained which contained 2.5% by weight of clay, based on the total amount of solid material. The mixture was stirred until no visible solid particles were visible anymore.

Of the composition that was thus obtained, coatings of a thickness of 90 μm were applied to substrates of steel, glass and aluminum. In addition, such a coating of the water-carried acryl/styrene composition without modified clay was applied. Of all the coatings, no differences worth mentioning in hardness, flexibility and adhesion could be demonstrated. By means of thermographic analysis techniques, it was established that the clay-containing layers proved to have a 30° C. higher degradation temperature.

EXAMPLE 3

20 Grams of an EXM 757 clay were dispersed in an excess of water and subjected to a reaction with 4.2 grams of methylene blue sodiumaminoundecanate (95 meq 4-amino-1-naphthalenesulfonic acid, based on 100 grams of solid clay, which is 100% of the exchange capacity of the clay). After stirring for 30 minutes at 60° C., the solid clay, modified with 4-amino-1-naphthalenesulfonic acid, was filtrated, and purified until there were no traces of chlorine ions present anymore. The material obtained was subsequently freeze-dried.

The thus modified clay was used in an organic/inorganic hybrid composition. This composition contained 50 mol % of 3-glycidoxypropyltrimethoxysilane (Aldrich), 30 mol % of methyltrimethoxysilane (Aldrich) and 20 mol % of aluminum-tri(sec)butoxide (Aldrich). This hybrid composition was prepared by of the constituents and hydrolysis utilizing 1 mole equivalent of water, based on the amount of alkoxides.

35 Grams of the hybrid composition (solids content 40% by weight) were mixed with 1.09 grams of the modified clay. This amount is equivalent to 5% by weight of clay, based on solids weight. A coating was applied and it was cured for 3 hours at 150° C. It was found that the layer thickness could simply be varied between 1 and 10 μm.

This is not possible with formulations not containing modified clay, because they often exhibit cracks.

What is claimed is:

1. A method for of preparing a composition for a coating, wherein a layered, inorganic filler, which filler is a natural or synthetic layered double hydroxide, is subjected to an ion exchange with a modifier, which modifier comprises at least two ionic groups, which groups are separated from each other by at least four atoms, and which modifier comprises at least one anionic group, and wherein the modified filler, together with a polymer, is dispersed in a diluent.

2. A method according to claim 1, wherein the layered, inorganic filler is a natural or synthetic clay with a cation exchange capacity of 30–200 milliequivalents per 100 grams.

3. A method according to claim 1, wherein the cationic group is an ammonium, phosphonium or sulfonium group.

4. A method according to claim 1, wherein the layered double hydroxide satisfies the formula (I):

$$[M_{(1-x)}^{2+}M_x^{3+}(OH)_2][A_{x/y}^{y-} \cdot n\, H_2O]$$

wherein $M^{2+}$ is a bivalent cation, $M^{3+}$ is a trivalent cation, x is a number between 0.15 and 0.5 y is 1 or 2, n is a number from 1 to 10, and A is an anion selected from the group consisting of Cl—, Br—, $NO_3$-, $SO_4^{2-}$ and $CO_3^{2-}$.

5. A method according to claim 1, wherein the anionic group is a carbonate, sulfonate, or phosphonate group.

6. A method according to claim 1, wherein the modifier comprises an aromatic group.

7. A method according to claim 1, wherein the modifier comprises an organic dye.

8. A method according to claim 1, wherein the diluent is polar.

9. A method according to claim 1, wherein the polymer is selected from the group consisting of polyurethanes; polyacrylates; polymethacrylates; polyesters; polyethers; polyolefins; polystyrene; polyvinyl chloride; alkyds; nitrocellulose; epoxides; phenol resins; amino resins; silicones; polysiloxanes; organic polymeric-inorganic ceramic hybrid materials; and combinations thereof.

10. A method according to claim 1, wherein an initiator is dispersed into the diluent.

11. The coating composition prepared by the method of claim 1.

12. A composition for coating comprising a polymer and a modified layered inorganic filler dispersed in a diluent, wherein the filler, which filler is a natural or synthetic layered double hydroxide, is modified by ion exchange with a modifier which comprises at least two ionic groups, which groups are separated from each other by at least four atoms and which modifier comprises at least one anionic group.

13. A coating formed upon curing of an applied composition according to claim 11.

14. A layered inorganic filler, which filler is a natural or synthetic layered double hydroxide, modified by ion exchange with a modifier which comprises at least two ionic groups, which groups are separated from each other by at least four atoms and which modifier comprises at least one anionic group.

15. A coating comprising the composition of claim 12.

16. A method of preparing a coating composition, wherein a layered inorganic filler is subjected to an ion exchange with a modifier, said modifier comprising at least two ionic groups, at least one of which is an anionic group and at least one of which is a cationic group, said at least two ionic groups being separated from each other by at least four atoms, and wherein the modified filler, together with a polymer, is dispersed in a diluent.

* * * * *